G. R. LEACH.
OPERATING AND CONTROL MECHANISM FOR DOORS AND THE LIKE.
APPLICATION FILED FEB. 2, 1918.

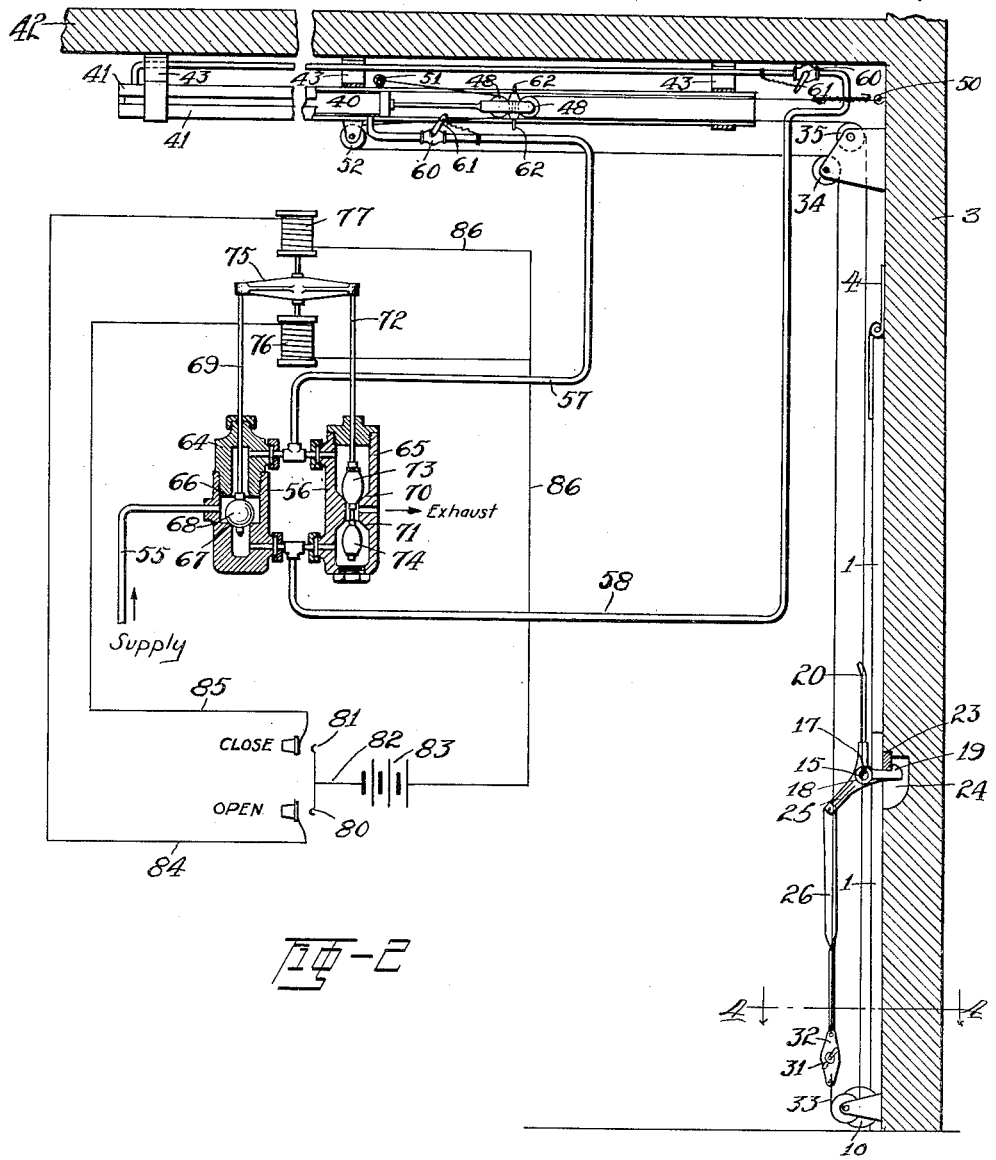

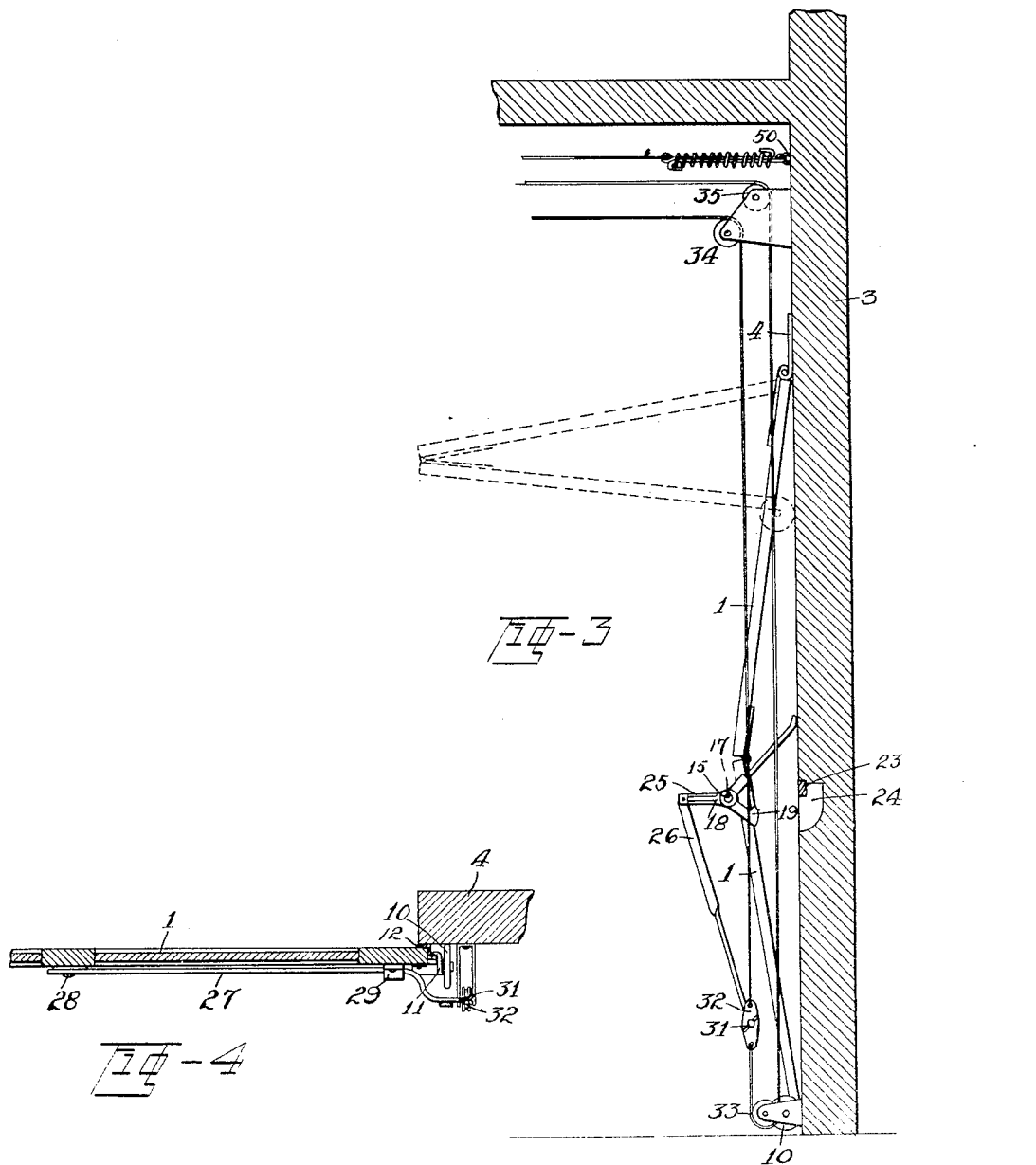

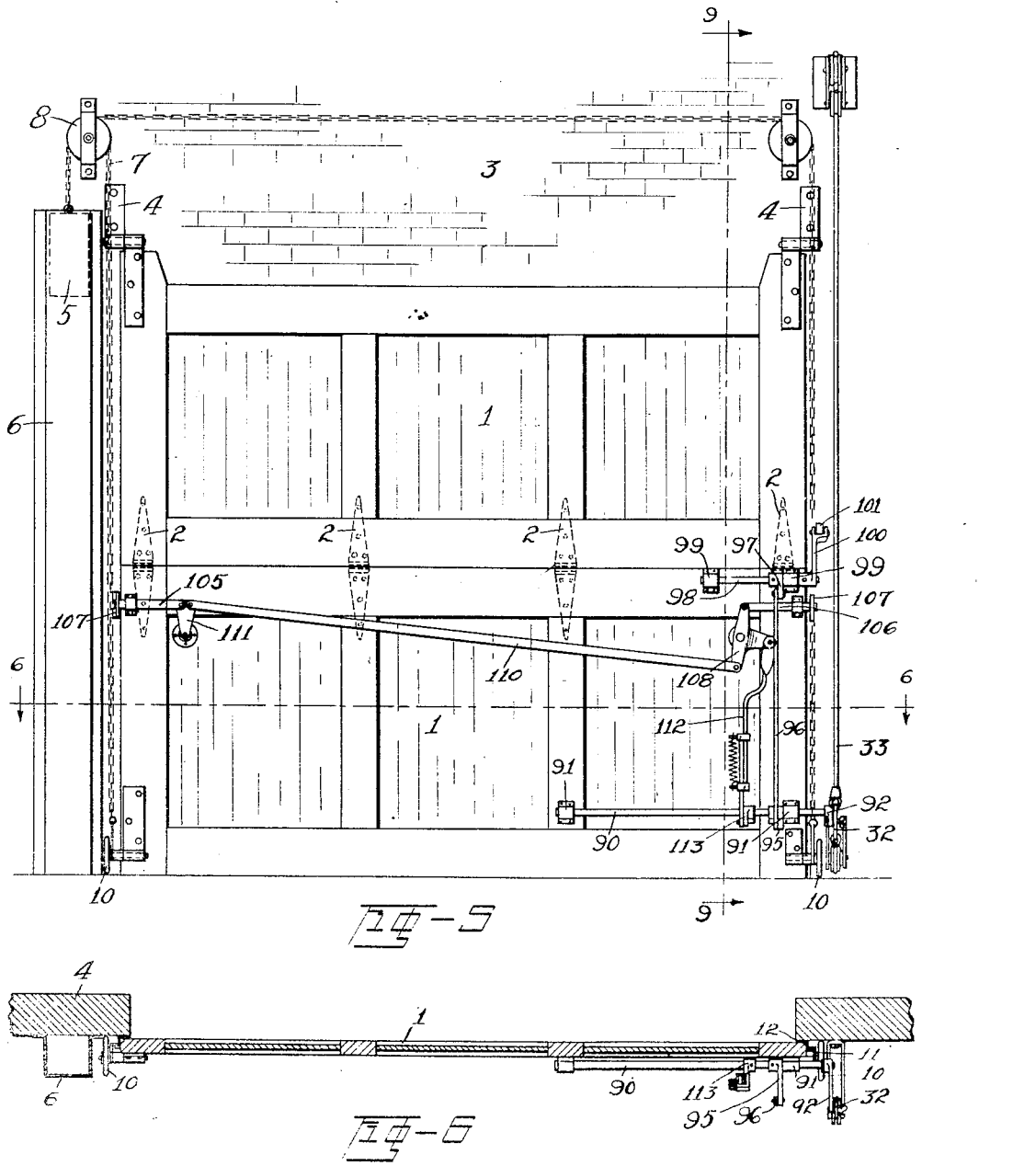

1,358,859.

Patented Nov. 16, 1920.

6 SHEETS—SHEET 5.

Inventor
Glen R. Leach.
By Hull, Smith, Brock & West
Attys.

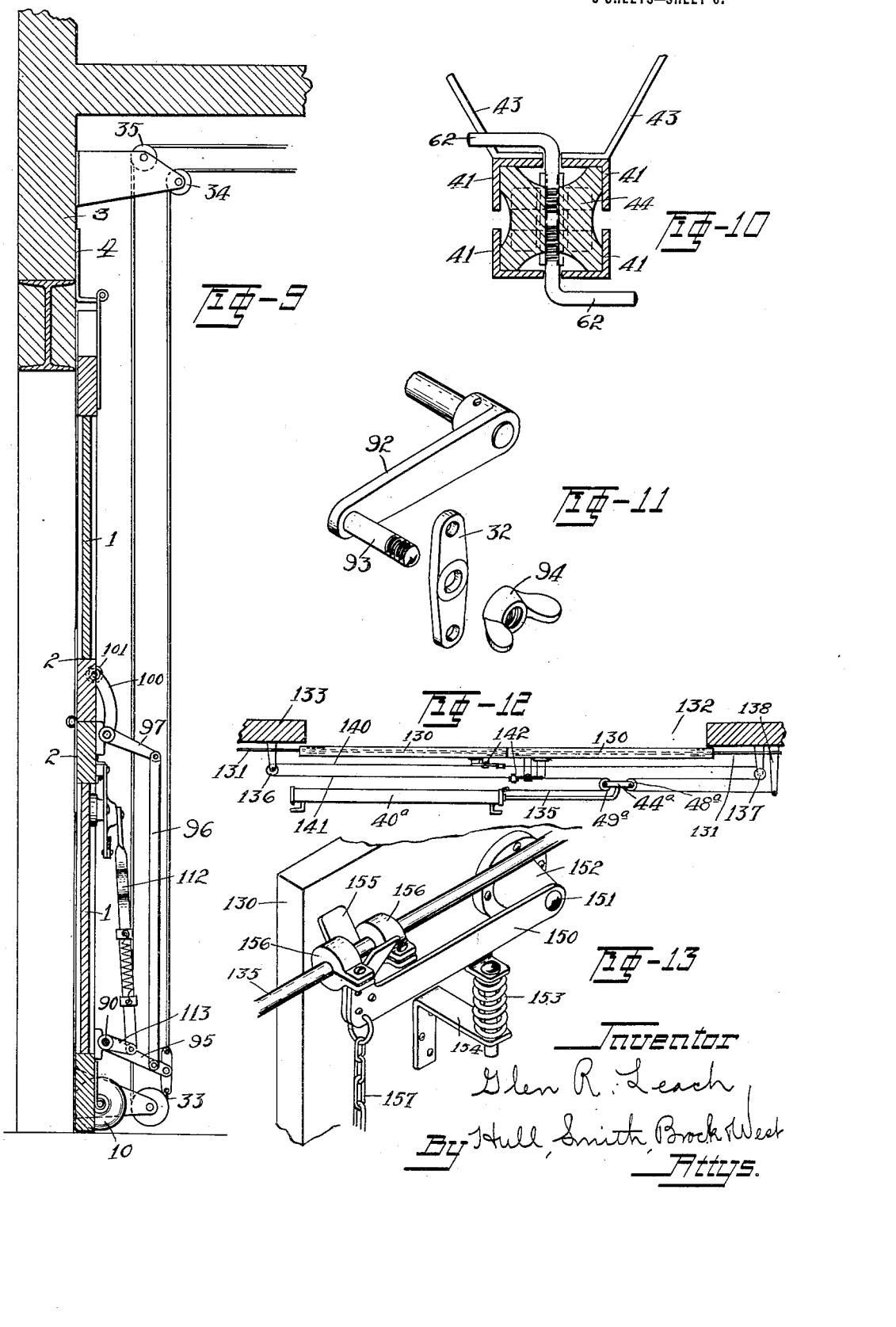

UNITED STATES PATENT OFFICE.

GLEN R. LEACH, OF LAKEWOOD, OHIO.

OPERATING AND CONTROL MECHANISM FOR DOORS AND THE LIKE.

1,358,859.     Specification of Letters Patent.     Patented Nov. 16, 1920.

Application filed February 2, 1918. Serial No. 215,153.

*To all whom it may concern:*

Be it known that I, GLEN R. LEACH, a citizen of the United States, residing at Lakewood, in the county of Cuyahoga and State of Ohio, have invented a certain new and useful Improvement in Operating and Control Mechanism for Doors and the like, of which the following is a full, clear, and exact description, reference being had to the accompanying drawings.

This invention relates to mechanism for operating and controlling doors, gates, and the like, the same being especially suitable for use in connection with heavy doors of the type employed in automobile garages and similar places.

The objects of the invention are to provide a comparatively simple door operating and controlling mechanism that may be produced, installed and maintained at a relatively low cost; that is positive of action and very convenient of operation, the same being readily disconnectible from the door or other closure wherewith it is used so that the door or closure may be manually operated if for any reason such should be desired.

Further objects are to provide a latch or lock for the door that is automatically rendered ineffective by the door operating means prior to opening the door, and likewise rendered effective by the same means after the door has been closed; and to include a contrivance for initiating the opening of a hinged door, especially of the folding type.

In the present instance the mechanism is operated by pressure fluid, preferably compressed air, and a still further object of the invention is to provide a valve arrangement which is actuated automatically to cut off the air from the cylinder when the mechanism has completed its opening or closing operation; and a further object is to provide means whereby the mechanism may be controlled from any one or a plurality of remote points.

The foregoing objects, and others which will become apparent as this description proceeds, are attained in the several modifications of my invention illustrated in the accompanying drawings and set out in the claims annexed hereto; and while I shall proceed to describe the present exemplifications of the invention in detail, I wish to be understood as not limiting myself to the structural details further than is required by the terms of the annexed claims; and throughout the description and claims, where the term "door" is used, it will be understood broadly to include any form of closure wherewith my invention is capable of use.

Figure 1:
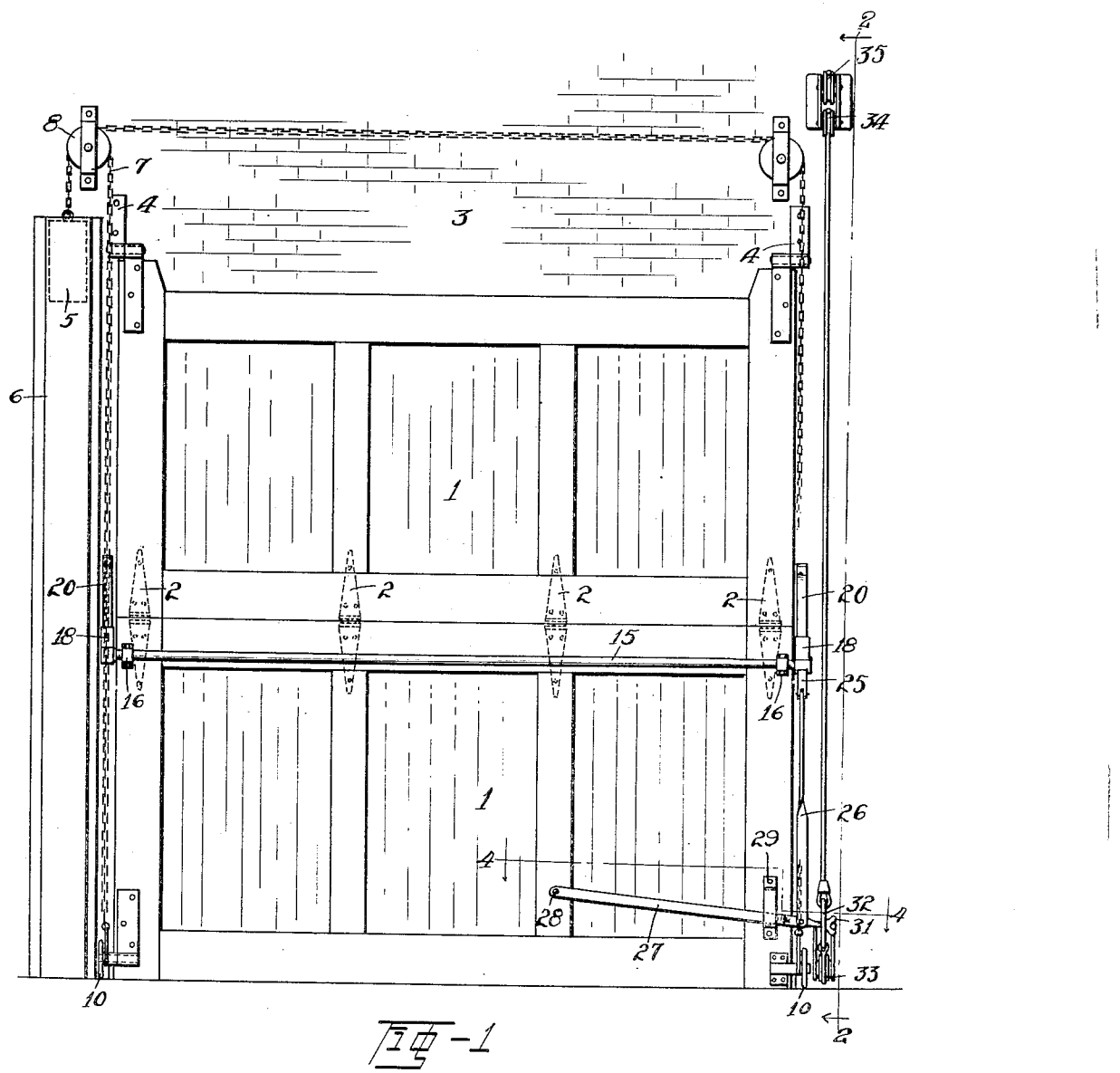
Figure 7:
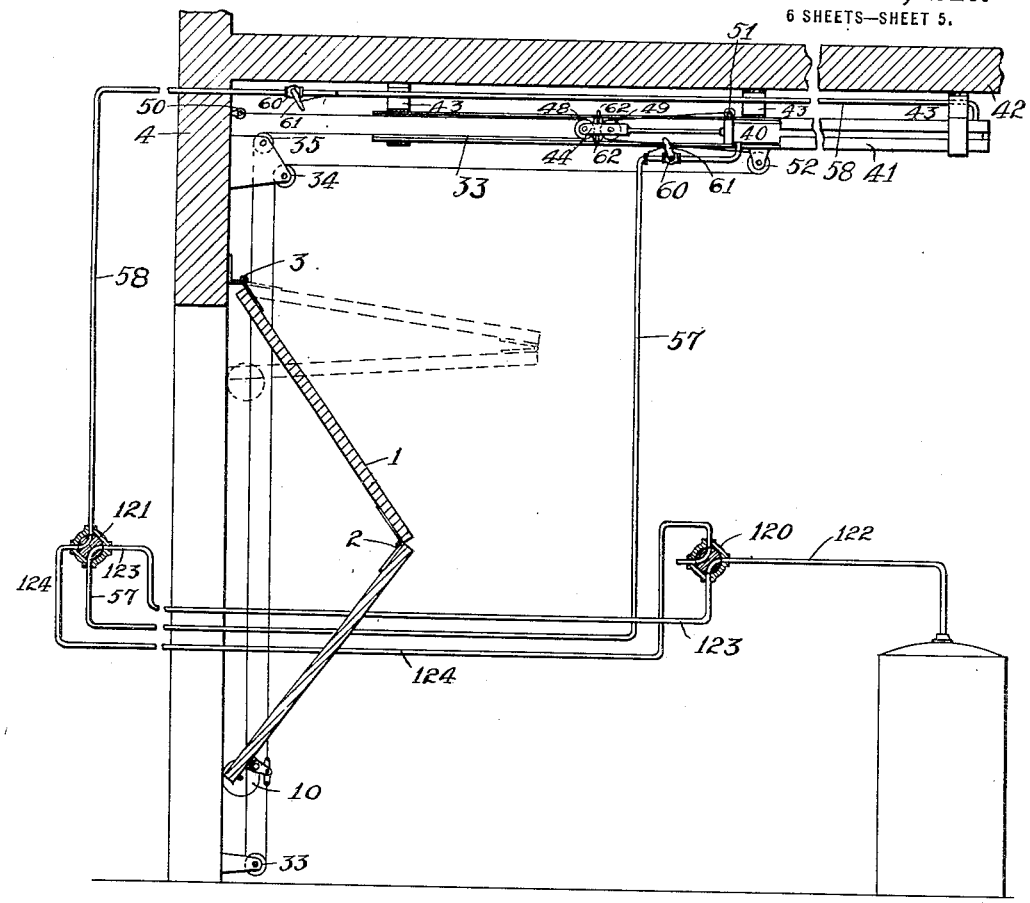
Figure 8:
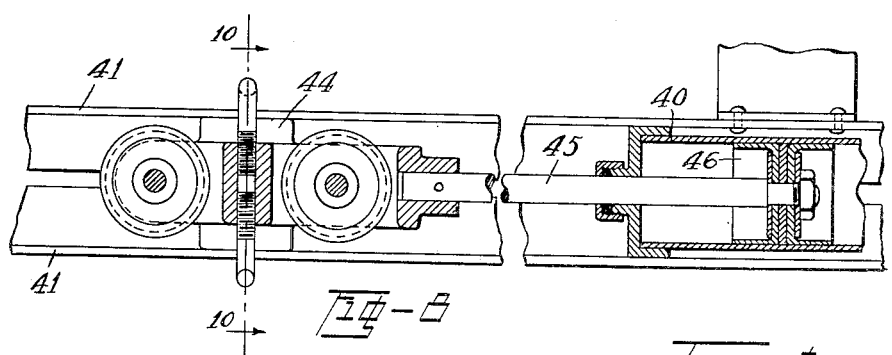

In the drawings, Figure 1 is an elevation of a folding door equipped with the present preferred form of my invention; Fig. 2 is a section through the wall adjacent the door, as indicated by the line 2—2 of Fig. 1, and it includes the door operating motor and control therefor; Fig. 3 is a section corresponding in plane to that of Fig. 2 but restricted to the door and the parts immediately adjacent thereto, this view showing the door unlatched and the joint broken, in full lines, and the door open, in dotted lines; Fig. 4 is a sectional detail on the lines 4—4 of Figs. 1 and 2; Fig. 5 is an elevation, similar to Fig. 1, of a door equipped with a modified form of my invention; Fig. 6 is a section on the line 6—6 of Fig. 5; Fig. 7 is a simplified sectional view, more or less diagrammatic, of the door and its operating mechanism shown in Fig. 5; Fig. 8 is a sectional detail of the pressure fluid motor; Fig. 9 is a section on the line 9—9 of Fig. 5; Fig. 10 is a section on the line 10—10 of Fig. 8; Fig. 11 shows, in perspective, the separable connection between the operating element and the mechanism carried by the door, the same being of the form incorporated in the modification illustrated in Figs. 5, 6, 7, and 9; Fig. 12 is a sectional plan view of a further modification of the invention applied to sliding doors; and Fig. 13 is a detail thereof in perspective.

My present invention is especially designed for use with folding doors that are hinged at their upper edges on a horizontal axis and comprise leaves or sections hinged together on an axis substantially parallel to the former axis and which fold together in the style of a jack knife as the doors are opened. In the forms of the invention illustrated in Figs. 1 to 11 a door of this type is shown at 1, the leaves or sections whereof are connected by the hinges 2. At its upper edge, the door is connected to the wall 3 by hinges 4, so that the door is capable of the action above mentioned and illustrated in Fig. 7. The door is counterbalanced by a weight 5 that is housed within a vertical casing 6, applied to the wall alongside the door, and is connected to the lower corners of the door by chains or other flexible elements 7 which are guided over pulleys 8. Rollers 10 are carried by the lower corners of the door to provide an anti-friction bearing for the door upon the wall and thus facilitate operation. The rollers are maintained in contact with the wall, and the door restrained to a definite course throughout its operation, by the coöperation of members 11 that are carried by the door, with rails 12 that are secured to the wall, the nature of this connection being clearly illustrated in Fig. 4.

With the door thus constructed, mounted, and counterbalanced by the weight 5, it is quite possible for an individual to manually operate a reasonably heavy door. However, even in the lighter doors, this would become burdensome where circumstances require frequent opening and closing of the doors. To facilitate this operation I have provided the mechanism which constitutes the subject of the present invention.

In its simplest and therefore its present preferred embodiment, illustrated in Figs. 1 to 4, the mechanism comprises a rock shaft 15 that is journaled within bearings 16 that are applied to one of the leaves or sections of the door adjacent its hinge connection with the other (in the present instance, the lower leaf), and each end of the shaft has secured to it, as by means of a key 17, a member 18 which comprises a latch 19, and a "kick-off" 20, the latter being so termed because of its function presently to be described. Each latch 19 is designed for coöperation with a keeper 23 that is shown as set into the wall at the upper edge of a cavity 24. In the present arrangement, the member 18 at the right hand end of the shaft 15 (as viewed in Fig. 1) has an arm 25, connected by a link 26 to the outer end of a lever 27 that is pivoted at 28 to the door, adjacent its lower edge. The lever may be maintained in close proximity to the surface of the door by a guide plate 29. The outer end of the lever is shaped to constitute a stud 30 that is threaded for the application of a nut 31. A separable connection is thus provided between the lever 27 and a link 32 that is included within a flexible operating element 33 (in the present instance, a cable) which is trained over pulleys 33, 34, and 35 (Figs. 2 and 3), the first of which is located adjacent the lower end of the door and the latter two above the door in such manner as to maintain the element in a vertical position alongside the door; and the element, with its link 32, is adapted to be moved in reverse directions by a pressure fluid motor which I will now describe.

This motor comprises a cylinder 40 that is shown as contained within a frame made up of four angle bars 41 connected together and suspended from the ceiling 42 by hangers 43, the angle bars extending a material distance beyond the forward end of the cylinder to constitute a guide for what I shall term, because of its analogy, a cross head 44 that is connected to the forward end of the rod 45 of a piston 46 (Fig. 8) which operates within the cylinder. The cross head is equipped with sheaves 48 and 49 over which end portions of the flexible operating element 33 are guided, the portion which extends about the sheave 48 having its end secured to an eye 50 that is shown as carried by the wall 3; while the opposite end of the element is secured, at 51, to the motor structure adjacent the forward end of the cylinder, the portion guided over the sheave 49 being also trained over a pulley 52 that is located beneath the cylinder.

Pressure fluid may be supplied from any source—through a pipe 55, suitable valve mechanism generally designated 56 in Fig. 2, and the respective branches 57 and 58—to the forward and rear ends of the cylinder 40. Each branch contains a valve 60, of a self opening nature, having an operating member 61 that is adapted to be engaged by a finger 62 extending from the cross head 44. When pressure fluid is introduced into rear end of the cylinder 40 through the branch 58, it will impel the piston and cross head forwardly until the appropriate finger of the cross head engages the operating member of the valve of branch 58 to close the valve and cut off the supply of pressure fluid to the cylinder. This not only relieves the cylinder and piston of unnecessary constant strain, but saves pressure fluid in that the joints of the cylinder and piston could not practically be maintained as tight as a single valve. Now when the operation is reversed and pressure fluid is introduced through the branch 57 to the forward end of the cylinder, the piston and cross head are driven rearwardly until the other finger of the cross head engages the operating member of the valve of branch 57 thereby to stop the flow of pressure fluid to the forward end of the cylinder. As soon as the cross head withdraws from the valve of branch 58, it will be understood that this valve opens to permit the rear end of the cylinder to freely exhaust, the same being true, of course, as to the valve of branch 57.

The valve 56, through which the action of the motor is controlled in the modification of Figs. 1 to 4, comprises an inlet casing 64 and an exhaust casing 65, the former having opposed inwardly disposed valve seats 66 and 67 with which coöperate the seat engaging portions of a valve body 68 that is carried by a rod 69, extending through one end of the casing. The exhaust casing 65 has outwardly disposed valve seats 70 and 71, and a rod 72 which extends in through one end of the casing carries valves 73 and 74 for coöperation with the respective seats. The corresponding ends of the casings 64 and 65 are communicatively connected to the branch 57, and their opposite ends are likewise connected to the branch 58. The rods 69 and 72 are joined by a beam 75 which carries opposed cores of solenoids 76 and 77.

80 and 81 are switches which have in common a connection through the lead 82 with one side of a battery 83, and the respective switches connect through conductors 84 and 85 with one end of the windings of the solenoids 77 and 76. The other ends of the solenoid windings have a connection with the opposite side of the battery through the return conductors 86.

The valve 56 may be placed at any convenient location, preferably in proximity to the motor, while the switches 80 and 81 are located at a point from which it is desired to operate the door. It may be explained, in this connection, that any number of switches may be included in the circuit and located at remote points, as desired, this elaboration upon the present exemplification requiring the customary double switch circuits that are well known in electric light wiring and similar situations.

Operation: When it is desired to open the door, the switch 80 is closed to energize the solenoid 77, thereby to attract its core which carries with it the beam 75 and the rods 69 and 72. This action results in engaging the valve 68 with the seat 66 in casing 64, and engaging valve 74 with seat 71, in casing 65. In consequence of this, pressure fluid is admitted from the pipe 55 through the branch 58 into the rear end of the cylinder 40, to drive the piston and cross head 44 forwardly, thereby to accumulate one end portion of the flexible operating element 33, while paying out the other, to cause the portion of the element containing the link 32 to be elevated. The initial movement of the link elevates the end of the lever 27, independent of any movement of the door, and this movement of the lever is transmitted, through the link 26, to the members 18 that are rigidly connected with the shaft 15. The oscillation of the members 18 withdraws their latches 19 from engagement with the keepers 23, and swings their kick-off arms 20 into contact with the adjacent wall portion or frame of the door, the angular movement of the arm being of sufficient extent to force the joint of the door leaves or sections outwardly and break the joint, which condition is illustrated in full lines in Fig. 3. Continued upward travel of the link 32 elevates the lower edge of the door during which the sections or leaves thereof fold together, as indicated in dotted lines in Fig. 3. The operation continues until the valve 60 of pipe 58 is closed, when the door is fully open. While pressure fluid is being admitted to the rear end of the cylinder it is being exhausted through the rear end thereof through the branch 57 and the end of the casing 65 with which said branch communicates, the casing being provided with an exhaust port, so labeled in Fig. 2.

To close the door, the switch 81 is operated to energize the solenoid 76 thereby to reverse the conditions formerly prevailing in the valve 56 and direct the pressure fluid, through branch 57, to the forward end of the cylinder, while permitting it to exhaust from the rear end of the cylinder through branch 58. There is sufficient yielding of the mechanism to permit the latches 19 to engage beneath the keepers 23 as the door resumes fully closed position.

The motor used in connection with the modification of the invention illustrated in Figs. 5, 6, 7, 9 and 11 is identical with that above described, and accordingly the same reference characters are used to designate the corresponding parts of the two motors.

In this latter modification, a rock shaft 90 is supported within bearings 91 near the lower right hand corner of the door, and where it projects beyond the edge of the door, it has secured to it a crank 92, the pin 93 whereof is adapted to be passed through the link 32 of the operating element 33, and is threaded for the application of the nut 94, this arrangement providing a separable connection between the door mechanism and the operating means. The free end of an arm 95, that is fastened to the shaft 90, is connected, through a link 96, with a similar arm 97 that is secured to a short rock shaft 98 journaled within bearings 99 that are carried by the door adjacent the joint between its sections or leaves. A "kick-off" 100 is secured to the end of the shaft 98 and is shown as equipped with a roller 101 for engagement with the adjacent portion of the wall. While I have shown but one "kick-off" arm in the present instance, it will be understood that the shaft 98 may be extended entirely across the door, in like manner with the shaft 15 of the former modification, and carry a second "kick-off" at the opposite end. Slide bolts 105 and 106 are carried by each edge of the door for coöperation with keepers 107 that are secured to the wall, and the inner end of bolt 106 is pivotally connected to one branch of a tri-arm member 108, while an opposed branch of said member is connected, through a link 110, with a shifting member 111, pivoted to the door, and to which is pivotally connected the inner end of bolt 105. A yielding link 112 connects the free end of the remaining arm of the member 108 with the outer end of an arm 113 that is fastened to the rock shaft 90.

In the present case I have shown the motor as controlled through a pair of four-way valves 120 and 121. One branch of valve 120 has connected to it the pressure fluid supply pipe 122, and it is adapted to exhaust through its opposite branch. One of its intermediate ports has communicative connection, through the pipe 123, with a port of the valve 121, and the opposite port of the last mentioned valve has connection, through the pipe 124, with the remaining port of valve 20. Branch 58, which leads to the rear end of the cylinder 40, has connection with one of the remaining ports of valve 121, while the opposite and last port thereof has communicative connection, through the branch 57, with the forward end of the cylinder. The valves 120 and 121 may be located where desired as, for instance, one inside the building, and the other outside, possibly located where it may be conveniently operated from a vehicle approaching or departing from the building.

With the valves in the condition illustrated in Fig. 7, pressure fluid will be admitted to the forward end of the cylinder to retract the piston and cross head and effect an operation of the flexible element 33 that results in the descent of link 32, thereby to close the door. During the admission of pressure fluid to the forward end of the cylinder 40, the rear end thereof is exhausted through the branch 58, valve 121, pipe 124, and valve 120. By shifting the position of the valve 120 to throw the supposition of the valve 120 to throw the supply into communication with the pipe 124, the pressure fluid will be directed through the branch 58 to the rear end of the cylinder, while the forward end of the cylinder is exhausting through the branch 57, valve 121, pipe 123, and valve 120. By shifting the position of the valve 120 to throw the supply into communication with the pipe 124, the pressure fluid will be directed through the branch 58 to the rear end of the cylinder, while the forward end of the cylinder is exhausting through the branch 57, valve 121, pipe 123, and valve 120. This operation causes the piston and cross head to be driven forwardly and the operating element to move in a direction to elevate the link 32. The initial movement of the link rocks the shaft 90, and through the yielding link 112 and the arm 113 to which it is connected, imparts this movement to the member 108 which results in the withdrawal of the bolts 105 and 106 from their respective keepers 107. The same movement of the shaft 90 is transmitted through the arms 95 and 97 and link 96, to the shaft 98 to oscillate the "kick-off" 100 thereby to forcibly engage it with the wall and break the joint of the door. Movement of the link 32 in the present direction will open the door to the position indicated in dotted lines in Fig. 7.

In Fig. 12 I have shown sliding doors 130, guided upon rails 131, and adapted to close the door opening 132 in the wall 133. The flexible operating element, designated 135, has one of its ends anchored adjacent the end of the cylinder 40ᵃ and is trained over the sheave 49ᵃ of the cross head 44ᵃ, and is thence directed over a pulley 136, located adjacent one side of the door opening, over a similar pulley 137 that is located adjacent the opposite side of the door opening, from where it is trained over the sheave 48ᵃ of the cross head and has its opposite end anchored to the wall bracket 138, in the vicinity of the pulley 137. This provides two branches 140 and 141 which are shown as extending substantially parallel with the doors 130. The adjacent edges of the right and left hand doors are shown as connected, through means 142, with the respective branches 141 and 140. As the motor is operated to project the cross head 44ᵃ outwardly, it will move the branches 140 and 141 in the direction indicated by the dotted line arrows, and result in opening the doors. The reverse operation closes the doors.

The connecting means 142 are preferably of such nature as to permit the doors to be disconnected from the operating element, and a suitable construction for attaining this end is illustrated in Fig. 13. A lever 150 is shown as pivoted at 151 to a standard 152 that is carried by the door, and the lever is maintained in elevated position by a compression spring 153, inserted between an offset of the lever and a bracket 154 that extends from the door, the spring tending to elevate the forked end 155 of the lever into operative relation with opposed collars or abutments 156 that are secured to the operating element. The arm 150 may be rocked in opposition to the spring 153 by a pull upon the chain 157 that is fastened to the outer or free end of the arm, to disengage it from between the collars or abutments 156, thereby freeing the door from the operating element and permitting it to be slid manually.

Having thus described my invention, what I claim is:

1. In combination with a structure and a door hingedly connected thereto, an element arranged to move to and fro, means for so moving the element, a "kick-off" for initiating the opening of the door, and connections whereby the initial movement of the element will operate the "kick-off" and further movement thereof will operate the door.

2. In combination with a structure and a door hingedly connected thereto, an element arranged to be moved to and fro, means for so moving the element, a latch comprising coöperating parts carried respectively by the door and structure, a "kick-off" for initiating the opening of the door, and connections whereby one phase of the element's movement will operate the latch, another phase will actuate the "kick-off," and another phase will operate the door.

3. In combination with a structure and a door hingedly connected thereto, an element arranged to move to and fro, means for so moving said element, a member movably carried by the door, separable connections between said member and the aforesaid element, latch mechanism for the door, a "kick-off" for initiating the opening of the door, and operative connections between the member, the latched mechanism, and the "kick-off."

4. In combination with a structure and a door hingedly connected thereto, an element arranged to be moved to and fro, means for so moving the element, a member movably carried by the door, connections between said member and the element, a "kick-off" for initiating the opening of the door, and operative connection between the aforesaid member and the "kick-off."

5. In combination with a structure and a door hingedly connected thereto, an element arranged to be moved to and fro, means for so moving the element, a member movably carried by the door, combined latch and "kick-off" mechanism, and operative connections between said mechanism and the aforesaid member.

6. In combination with a structure and a door movably supported thereby, an operating element arranged to be moved to and fro, means for so moving said element, a lever pivoted to the door, connections between the lever and element, a rock shaft carried by the door, a latch arm secured to the shaft for coöperation with a keeper carried by the structure, and operative connections between the lever and rock shaft.

7. In combination with a structure and a door hingedly connected thereto, an operating element arranged to move to and fro, means for so moving said element, a lever pivoted to the door, connections between the lever and element, a rock shaft carried by the door, a "kick-off" secured to the shaft for coöperation with a part of the structure, and operative connections between the lever and rock shaft.

8. In combination with a structure and a door hingedly connected thereto, an operating element arranged to be moved to and fro, means for so moving said element, a lever pivoted to the door, connections between the lever and said element, a rock shaft carried by the door, a combined latch and "kick-off" secured to the shaft for coöperation with parts of the structure, and operative connections between the lever and rock shaft.

9. In a pressure fluid motor, the combination of a cylinder, a piston within said cylinder having a rod, a cross head carried by the rod, and a frame inclosing the cylinder and extending beyond one end thereof to constitute a guide for the cross head.

10. In a pressure fluid motor, the combination of a cylinder, a piston within the cylinder having a rod, a cross head carried by the rod, a frame organized of inwardly opening angle bars incasing the cylinder and extending beyond one end thereof to constitute a guide for the cross head.

11. In combination with a structure and a door movably supported thereby, a door moving element operatively connected to the door and arranged with opposed branches, a pressure fluid motor for operating the element and comprising a cylinder containing a piston having a piston rod, and a pair of sheaves arranged in tandem formation and carried by the piston rod substantially in alinement therewith and over the respective ones of which a branch of the element is engaged.

In testimony whereof, I hereunto affix my signature.

GLEN R. LEACH.